United States Patent Office 3,833,592
Patented Sept. 3, 1974

3,833,592
TROPANYL α,α-DIPHENYL-α-FLUOROACETATE ESTERS
Zinon B. Papanastassiou, Lexington, and Edward R. Atkinson and Donna D. McRitchie, Wellesley, Mass., assignors to Arthur D. Little, Inc., Cambridge, Mass.
No Drawing. Filed May 31, 1966, Ser. No. 553,728
Int. Cl. C07d 43/06
U.S. Cl. 260—292                                3 Claims

ABSTRACT OF THE DISCLOSURE

2-, 3-, or 6-(8-$R_3$-nortropanyl) α,α-diphenyl-α-fluoroacetate esters having anticholinergic activity and prepared by transesterification of a lower-alkyl α,α-diphenyl-α-fluoroacetate with a 2-, 3-, or 6-(8-$R_3$-nortropanol).

---

This invention relates to quinuclidinyl and tropanyl α,α-diphenyl-α-fluoroacetate esters and to a method of preparing the same.

3-Quinuclidinyl and 2α-tropanyl diphenylhydroxyacetate esters of the formulas:

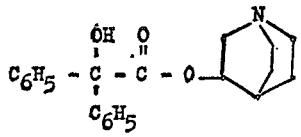

and

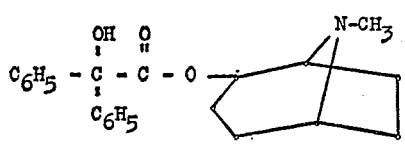

i.e. the benzilate esters of 3-quinuclidinol and 2α-tropanol, respectively, are known. Moreover, it is also generally known to substitute for the hydroxy group in benzilate esters having anticholinergic activity the halogen atoms chlorine, bromine, and iodine. 3-Quinuclidinyl and 2α-tropanyl benzilates and certain basic α,α-diphenyl-α-halo esters, where halo is specifically chlorine, bromine or iodine, are known anticholinergic agents, but these compounds all possess a high central nervous system component of action and a relatively low peripheral component. Because of this high ratio of C.N.S. to peripheral components, such compounds have the disadvantage of inducing a variety of unwanted effects of C.N.S. origin such as dizziness, incoordination, and a general dulling of the senses and faculties.

It has now been surprisingly found that certain quinuclidinyl and tropanyl diphenylacetate esters having a fluorine atom on the α-carbon atom of the acetate group possess a substantially reduced C.N.S. component of action, i.e. a lower ratio of C.N.S. to peripheral components, with the result that the fluoro compounds are active anticholinergic agents in which the above-noted side effects of central origin are minimized.

The compounds of the present invention, in free base form, are therefore represented by the formula:

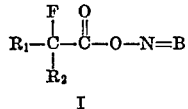

I where $R_1$ and $R_2$ are phenyl, and N=B is 3-quinuclidinyl or 2-, 3-, or 6-(8-$R_3$-nortropanyl), including the α- and β-isomers of each of the latter, and where $R_3$ is hydrogen, lower-alkyl (including methyl, i.e. the α- and β-isomers of 2-, 3-, or 6-tropanyl), lower-alkenyl, lower-alkynyl, cycloalkyl-lower-alkyl, or phenyl-lower-alkyl. The compounds of the invention are thus also represented by the formulas:

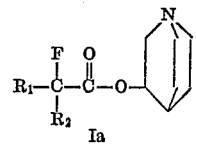

Ia

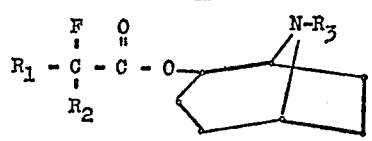

Ib

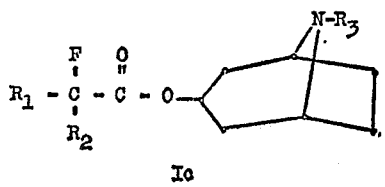

Ic

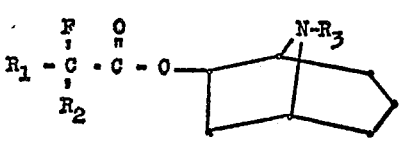

Id where $R_1$, $R_2$, and $R_3$ have the meanings given above.

In the above formulas Ib, Ic, and Id, where $R_3$ represents lower-alkyl, phenyl-lower-alkyl, or cycloalkyl-lower-alkyl, the lower-alkyl group preferably has from one to four carbon atoms and thus includes such groups as methyl, ethyl, propyl, isopropyl, butyl, isobutyl, and the like. And when $R_3$ represents cycloalkyl-lower-alkyl, the cycloalkyl moiety contains from three to six ring carbon atoms, and cycloalkyl-lower-alkyl thus includes cyclopropylmethyl, cyclobutylmethyl, cyclopentylmethyl, cyclohexylmethyl, 2-(cyclopropyl)ethyl, 3-(cyclopropyl)propyl, and the like. When $R_3$ represents lower-alkenyl or lower-alkynyl, the lower-alkenyl or lower-alkynyl groups preferably have from three to four carbon atoms and thus includes such groups as allyl, methallyl, 2-butenyl, 2-propynyl, 3-butynyl, 2-butynyl, and the like.

When $R_1$ and $R_2$ represent phenyl or when $R_3$ represents phenyl-lower-alkyl, the benzene ring thereof can be unsubstituted or can bear one or more substituents of low molecular weight and of such nature that they do not interfere with or take part in the reactions, to be described hereinafter, used in the preparation of the compounds. Examples of such substituents include halogen, loweralkyl, lower-alkoxy, lower-alkylmercapto, lower-alkylsulfinyl, lower-alkylsulfonyl, nitro, trifluoromethyl, methylenedioxy, benzyloxy, benzyl, lower-alkanoylamino, sulfamyl, and the like.

The compounds of formula I are prepared by transesterification of a lower-alkyl α,α-diphenyl-α-fluoroacetate with an appropriate 3-quinuclidinol or an appropriate 2-, 3-, or 6-(8-$R_3$-nortropanol) (or 2-, 3-, or 6-tropanol). The reaction is preferably carried out in an organic solvent inert under the conditions of the reaction, for example benzene, toluene, xylene, cyclohexane, n-heptane, and the like, and in the presence of a basic catalyst, such as alkali metal alkoxides. The reaction is represented by the equation:

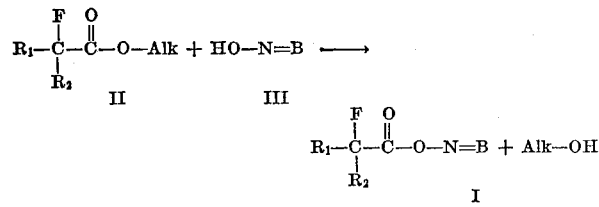

where $R_1$, $R_2$, and N=B have the meanings given above, and Alk represents lower-alkyl. The intermediates of formula III are, by analogy to formulas Ia–Id, understood to have the formulas IIIa–IIId as follows:

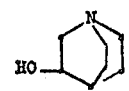 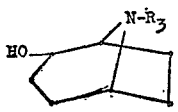

IIIa          IIIb

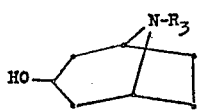 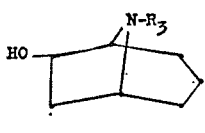

IIIc          IIId where $R_3$ has the meanings given above.

The lower-alkyl α,α-diphenyl-α-fluoroacetate esters of formula II required as intermediates in the preparation of the compounds of formulas Ia–Id are conveniently prepared by reacting the corresponding lower-alkyl α,α-diphenyl-α-chloroacetate with anhydrous silver fluoride and calcium fluoride using the method of Adickes, J. Prakt. Chem. [2], 161, 277 (1943).

The lower-alkyl α,α-diphenyl-α-chloroacetates in turn are prepared by reaction of the corresponding benzilic acid with phosphorous pentachloride, using the procedure of Billman et al., J. Am. Chem. Soc., 65, 760 (1943) and reacting the resulting α,α-diphenyl-α-chloroacetyl chloride with a lower-alkanol.

The nortropanols of formula IIIb, c, or d where $R_3$ is hydrogen, lower-alkyl other than methyl, lower-alkenyl, lower-alkynyl, cycloalkyl-lower-alkyl, or phenyl-lower-alkyl are prepared from the known 2-, 3-, or 6-tropanols as follows: an ester of 2-, 3-, or 6-tropanol is treated with cyanogen bromide in an inert solvent at about 50° C. During this process the N-methyl group is removed and replaced by a cyano group to give an 8-cyano-2-, 3-, or 6-nortropanyl ester. The latter, upon refluxing with concentrated hydrochloric acid, is hydrolyzed and decarboxylated to give 2-, 3-, or 6-nortropanol ($R_3$ is H). The 2-, 3-, or 6-nortropanol can then be alkylated with any desired lower-alkyl halide, lower-alkenyl halide, lower-alkynyl halide, cyclo-alkyl-lower-alkyl halide, or phenyl-lower-alkyl halide in the presence of an acid-acceptor such as sodium carbonate to give the intermediate nortropanols of formulas IIIb, c, and d where $R_3$ is lower-alkyl, lower-alkenyl, lower-alkynyl, cycloalkyl-lower-alkyl, or phenyl-lower-alkyl.

The novel compounds of the instant invention are the bases of formulas Ia–Id and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their corresponding acid-addition salts are readily interconvertible.

It will thus be appreciated that formulas Ia–Id not only represent the structural configurations of the bases of our invention but each is also representative of the respective structural entity which is common to all of our respective compounds, whether in the form of the free bases or in the form of the acid-addition salts of the bases. We have found that by virtue of this common structural entity, the bases and their acid-addition salts have inherent pharmacodynamic activity of a type more fully described herein. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from the usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively, they can be converted to pharmaceutically-acceptable acid-addition salts, by, for example, ion-exchange procedures.

It will be appreciated for the foregoing that all of the acid-addition salts of our new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new quinuclidinol and tropanol esters, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Pharmacological evaluation of the compounds of formulas Ia–Id has demonstrated that they possess anticholinergic activity thus indicating their usefulness as antispasmodics and preanesthetic antisecretory agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solutions, or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

PREPARATION OF INTERMEDIATES

Example 1

Methyl $\alpha,\alpha$-diphenyl-$\alpha$-fluoroacetate [II: $R_1$ and $R_2$ are $C_6H_5$; Alk is $CH_3$].—A solution of 26.5 g. (0.1 mole) of $\alpha,\alpha$-diphenyl-$\alpha$-chloroacetyl chloride in 4 ml. (0.1 mole) of anhydrous methanol was stirred at 70° C. for twenty-six hours in a sealed pressure bottle. The reaction mixture was evacuated to remove hydrogen chloride and then distilled in vacuo. The fraction boiling at 145–146° C/0.35 mm. was collected as product thus giving 22.5 g. of methyl $\alpha,\alpha$-diphenyl-$\alpha$-chloroacetate.

A solution of 13 g. (0.05 mole) of methyl $\alpha,\alpha$-diphenyl-$\alpha$-chloroacetate in 50 ml. of dry acetonitrile was added to a mixture of 12.7 g. (0.1 mole) of anhydrous silver fluoride and 7.8 g. (0.1 mole) of calcium fluoride in 25 ml. of acetonitrile. The reaction mixture was refluxed for thirty hours with exclusion of light and of atmospheric moisture, diluted with 100 ml. of chloroform, refluxed for an additional thirty minutes and then filtered. The filter was washed with two 50 ml. portions of chloroform, and the combined organic filtrate was washed by shaking with two 100 ml. portions of water, dried over anhydrous sodium sulfate and taken to dryness. The residual black oil was taken into warm acetone, the solution diluted with petroleum ether, and the orange solution was decanted from the black tar which separated. Evaporation of the solution to dryness, recrystallization of the residue from methanol-isopropanol, and washing the crystalline product with cold isopropanol afforded 6 g. of methyl $\alpha,\alpha$-diphenyl-$\alpha$-fluoroacetate, m.p. 63–64° C.

Example 2

Methyl $\alpha$-(4-chlorophenyl)-$\alpha$-phenyl-$\alpha$-fluoroacetate [II: $R_1$ is 4-ClC$_6$H$_4$; $R_2$ is $C_6H_5$; Alk is $CH_3$].—By reacting 4-chlorobenzilic acid with phosphorus pentachloride according to the procedure described by Billman et al., J. Am. Chem. Soc. 65, 760 (1943); reacting the resulting $\alpha$-(4-chlorophenyl)-$\alpha$-phenyl-$\alpha$-chloroacetyl chloride with anhydrous methanol using the procdure described above in Example 1, and reacting the resulting methyl $\alpha$-(4-chlorophenyl)-$\alpha$-phenyl-$\alpha$-chloroacetate with anhydrous silver fluoride and calcium fluoride using the procedure described above in Example 1, there is obtained methyl $\alpha$-(4-chlorophenyl)-$\alpha$-phenyl-$\alpha$-fluoroacetate.

Example 3

Proceeding in a manner similar to that described in Examples 1 and 2 above, there are prepared the following compounds of formula II, where Alk in each case is $CH_3$:

(a) Methyl $\alpha,\alpha$-di-(4-bromophenyl) - $\alpha$ - fluoroacetate [II: $R_1$ and $R_2$ are 4-BrC$_6$H$_4$[ starting with 4,4'-dibromobenzilic acid;

(b) Methyl $\alpha$-(4-methylphenyl) - $\alpha$ - phenyl-$\alpha$-fluoroacetate [II: $R_1$ is 4-CH$_3$C$_6$H$_4$; $R_2$ is $C_6H_5$] starting with 4-methylbenzilic acid;

(c) Methyl $\alpha$-(2,3,4,5 - tetramethylphenyl)-$\alpha$-phenyl-$\alpha$-fluoroacetate [II: $R_1$ is 2,3,4,5-(CH$_3$)$_4$C$_6$H; $R_2$ is $C_6H_5$] starting with 2,3,4,5-tetramethylbenzilic acid;

(d) Methyl $\alpha$-(4-cyclohexylphenyl) - $\alpha$-phenyl-$\alpha$-fluoroacetate [II: $R_1$ is 4-C$_6$H$_{11}$C$_6$H$_4$; $R_2$ is $C_6H_5$] starting with 4-cyclohexylbenzilic acid;

(e) Methyl $\alpha,\alpha$ - di - (3 - methoxyphenyl) - $\alpha$ - fluoroacetate [II: $R_1$ and $R_2$ are 3-CH$_3$OC$_6$H$_4$] starting with 3,3'-dimethoxybenzilic acid;

(f) Methyl $\alpha,\alpha$ - di - (3,4 - methylenedioxyphenyl)-$\alpha$-fluoroacetate [II: $R_1$ and $R_2$ are

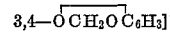

starting with 3,4,3',4'-di-(methylenedioxy) benzilic acid;

(g) Methyl $\alpha$ - (4 - benzyloxyphenyl) - $\alpha$ - phenyl - $\alpha$-fluoroacetate [II: $R_1$ is 4-C$_6$H$_5$CH$_2$OC$_6$H$_4$; $R_2$ is $C_6H_5$] starting with 4-benzyloxybenzilic acid;

(h) Methyl $\alpha$ - (4 - phenoxyphenyl) - $\alpha$ - phenyl - $\alpha$-fluoroacetate [II: $R_1$ is 4-C$_6$H$_5$OC$_6$H$_4$; $R_2$ is $C_6H_5$] starting with 4-phenoxybenzilic acid;

(i) Methyl $\alpha$ - (3 - hydroxyphenyl) - $\alpha$ - phenyl - $\alpha$-fluoroacetate [II: $R_1$ is 3-HOC$_6$H$_4$; $R_2$ is $C_6H_5$] starting with 3-hydroxybenzilic acid;

(j) Methyl $\alpha,\alpha$ - di - (5 - bromo - 2 - hydroxyphenyl)-$\alpha$-fluoroacetate [II: $R_1$ and $R_2$ are 5-Br-2-HOC$_6$H$_3$] starting with 5,5'-dibromo-2,2'-dihydroxybenzilic acid;

(k) Methyl $\alpha,\alpha$ - di - (2 - nitrophenyl) - $\alpha$ - fluoroacetate [II: $R_1$ and $R_2$ are 2-NO$_2$C$_6$H$_4$] starting with 2,2'-dinitrobenzilic acid;

(l) Methyl $\alpha$ - (3 - methylmercaptophenyl) - $\alpha$ - phenyl-$\alpha$-fluoroacetate [II: $R_1$ is 3-CH$_3$SC$_6$H$_4$; $R_2$ is $C_6H_5$] starting with 3-methylmercaptobenzilic acid;

(m) Methyl $\alpha$ - (4 - dimethylaminophenyl) - $\alpha$ - phenyl-$\alpha$-fluoroacetate [II: $R_1$ is 4-(CH$_3$)$_2$NC$_6$H$_4$; $R_2$ is $C_6H_5$] starting with 4-dimethylaminobenzilic acid; and (n) Methyl $\alpha$ - (4 - biphenyl) - $\alpha$ - phenyl - $\alpha$-fluoroacetate [II: $R_1$ is 4-C$_6$H$_5$-C$_6$H$_4$; $R_2$ is $C_6H_5$] starting with 4-phenylbenzilic acid.

Example 4

Methyl $\alpha$ - (4 - methylsulfonylphenyl) - $\alpha$ - phenyl - $\alpha$-fluoroacetate [II: $R_1$ is 4-CH$_3$SO$_2$C$_6$H$_4$; $R_2$ is $C_6H_5$; Alk is $CH_3$].—By reacting 4-methylsulfonylbenzil with warm aqueous sodium hydroxide, isolating the product from a neutral or acid medium, there is obtained 4-methylsulfonylbenzilic acid. Proceeding in a manner similar to that described in Examples 1 and 2 above, the latter is converted to methyl $\alpha$-(4-methylsulfonylphenyl)-$\alpha$-phenyl-$\alpha$-fluoroacetate.

PREPARATION OF FINAL PRODUCTS

Example 5

3 - Quinuclidinyl, $\alpha,\alpha$ - diphenyl - $\alpha$ - fluoroacetate [Ia: $R_1$ and $R_2$ are $C_6H_5$].—A mixture of 3.5 g. (0.014 mole) of methyl $\alpha,\alpha$ - diphenyl - $\alpha$ - fluoroacetate, 1.9 g. (0.015 mole) of 3-quinuclidinol, 60 mg. of sodium methoxide, and 80 ml. of dry toluene was distilled slowly. After thirty minutes the theoretical volume of methanol was collected, and the reaction mixture was cooled and poured into 100 ml. of ice cold 20% hydrochloric acid. The mixture was stirred until both the organic and aqueous phases were clear, and the aqueous phase was separated and extracted with ether. The organic extracts were discarded, and the aqueous phase was basified by addition of strong sodium hydroxide and extracted three times with 100 ml. portions of methylene dichloride. The combined extracts were dried over anhydrous sodium sulfate and evaporated to give 4 g. of 3 - quinuclidinyl $\alpha,\alpha$ - diphenyl - $\alpha$ - fluoroacetate, which later solidified to give material of m.p. 59–61° C.

Analysis.—Calcd. for C$_{21}$H$_{22}$FNO$_2$: C, 74.31; H, 6.54; F, 5.60; N, 4.13. Found: C, 74.58; H, 6.76; F, 5.77; N, 4.41.

Example 6

Proceeding in a manner similar to that described in Example 5 above, substituting for the methyl α,α-diphenyl-α-fluoroacetate used therein a molar equivalent amount of an appropriate lower-alkyl substituted - α,α - diphenyl-α-fluoroacetate, there can be obtained:

(a) 3 - Quinuclidinyl α - (4 - chlorophenyl) - α - phenyl-α-fluoroacetate [Ia: $R_1$ is 4-$ClC_6H_4$; $R_2$ is $C_6H_5$] from 3-quinuclidinol and methyl α - (4 - chlorophenyl) - α-phenyl-α-fluoroacetate;

(b) 3 - Quinuclidinyl α,α - di - (4 - bromophenyl) - α-fluoroacetate [Ia: $R_1$ and $R_2$ are 4-$BrC_6H_4$] from 3-quinuclidinol and methyl α,α - di - (4 - bromophenyl) - α-fluoroacetate;

(c) 3 - Quinuclidinyl α-(4 - methylphenyl) - α - phenyl-α-fluoroacetate [Ia: $R_1$ is 4-$CH_3C_6H_4$; $R_2$ is $C_6H_5$] from 3-quinuclidinol and methyl α - (4 - methylphenyl) - α-phenyl-α-fluoroacetate;

(d) 3 - Quinuclidinyl α - (2,3,4,5 - tetramethylphenyl)-α-phenyl-α-fluoroacetate [Ia: $R_1$ is 2,3,4,5-$(CH_3)_4C_6H$; $R_2$ is $C_6H_5$] from 3-quinuclidinol and methyl α-(2,3,4,5-tetramethylphenyl)-α-phenyl-α-fluoroacetate;

(e) 3 - Quinuclidinyl α - (4 - cyclohexylphenyl) - α-phenyl-α-fluoroacetate [Ia: $R_1$ is 4-$C_6H_{11}C_6H_4$; $R_2$ is $C_6H_5$] from 3 - quinuclidinol and methyl α - (4 - cyclohexylphenyl)-α-phenyl-α-fluoroacetate;

(f) 3 - Quinuclidinyl α,α - di - (3 - methoxyphenyl)-α-fluoroacetate [Ia: $R_1$ and $R_2$ are 3-$CH_3OC_6H_4$] from 3-quinuclidinol and methyl α,α-di-(3-methoxyphenyl)-α-fluoroacetate;

(g) 3 - Quinuclidinyl α,α - di - (3 - methylenedioxyphenyl)-α-fluoroacetate [Ia: $R_1$ and $R_2$ are

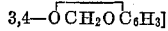

3,4—$OCH_2OC_6H_3$]

from 3-quinuclidinol and methyl α,α - di - (3,4 - methylenedioxyphenyl)-α-fluoroacetate;

(h) 3 - Quinuclidinyl α - (4 - benzyloxyphenyl) - α-phenyl-α-fluoroacetate [Ia: $R_1$ is 4-$C_6H_5CH_2OC_6H_4$; $R_2$ is $C_6H_5$] from 3-quinuclidinol and methyl α - (4 - benzyloxyphenyl)-α-phenyl-α-fluoroacetate;

(i) 3 - Quinuclidinyl α - (4 - phenoxyphenyl) - α-phenyl-α - fluoroacetate [Ia: $R_1$ is 4-$C_6H_5OC_6H_4$; $R_2$ is $C_6H_5$] from 3-quinuclidinol and methyl α - (4 - phenoxyphenyl)-α-phenyl-α-fluoroacetate;

(j) 3 - Quinuclidinyl α - (3 - hydroxyphenyl) - α-phenyl - α - fluoroacetate [Ia: $R_1$ is 3-$HOC_6H_4$; $R_2$ is $C_6H_5$] from 3-quinuclidinol and methyl α - (3 - hydroxyphenyl)-α-phenyl-α-fluoroacetate;

(k) 3 - Quinuclidinyl α,α - di - (5 - bromo - 2 - hydroxyphenyl) - α - fluoroacetate [Ia: $R_1$ and $R_2$ are 5-Br-2-$HOC_6H_3$] from 3-quinuclidinol and methyl α,α-di-(5 bromo-2-hydroxyphenyl)-α-fluoroacetate;

(l) 3 - Quinuclidinyl α,α - di - (2 - nitrophenyl) - α-fluoroacetate [Ia: $R_1$ and $R_2$ are 2-$NO_2C_6H_4$] from 3-quinuclidinol and methyl α,α - di - (2 - nitrophenyl) - α-fluoroacetate;

(m) 3 - Quinuclidinyl α - (3-methylmercaptophenyl)-α-phenyl - α - fluoroacetate [Ia: $R_1$ is 3-$CH_3SC_6H_4$; $R_2$ is $C_6H_5$] from 3-quinuclidinol and methyl α-(3-methylmercaptophenyl)-α-phenyl-α-fluoroacetate;

(n) 3 - Quinuclidinyl α - (4 - dimethylaminophenyl)-α-phenyl-α-fluoroacetate [Ia: $R_1$ is 4-$(CH_3)_2NC_6H_4$; $R_2$ is $C_6H_5$] from 3-quinuclidinol and methyl α-(4-dimethylaminophenyl)-α-phenyl-α-fluoroacetate;

(o) 3 - Quinuclidinyl α-(4-biphenylyl)-α-phenyl-α-fluoroacetate [Ia: $R_1$ is $C_6H_5$-$C_6H_4$; $R_2$ is $C_6H_5$] from 3-quinuclidinol and methyl α-(4-biphenylyl)-α-phenyl-α-fluoroacetate; and (p) 3 - Quinuclidinyl α - (4 - methylsulfonylphenyl)-α-phenyl-α-fluoroacetate [Ia: $R_1$ is 4-$CH_3SO_2C_6H_4$; $R_2$ is $C_6H_5$] from 3-quinuclidinol and methyl α-(4-methylsulfonylphenyl)-α-phenyl-α-fluoroacetate.

Example 7

2α-Tropanyl α,α-diphenyl-α-fluoroacetate [Ib: $R_1$ and $R_2$ are $C_6H_5$; $R_3$ is $CH_3$] was prepared from 3.5 g. (0.014 mole) of methyl α,α-diphenyl-α-fluoroacetate, 2.0 g. (0.014 mole) of 2α-tropanol, 60 mg. of sodium methoxide, and 80 ml. of dry n-heptane following the procedure described above in Example 5. The crude product was recrystallized from hexane to give 2 g. of 2α-tropanyl α,α-diphenyl-α-fluoroacetate, m.p. 73–74° C.

Analysis.—Calcd. for $C_{22}H_{24}FNO_2$: C, 74.76; H, 6.84; F, 5.38; N, 3.96. Found: C, 74.52; H, 6.50; F, 5.24; N, 4.13.

Example 8

Proceeding in a manner similar to that described in Example 7 above, substituting for the methyl α,α-diphenyl-α-fluoroacetate used therein a molar equivalent amount of an appropriate lower-alkyl substituted-α,α-diphenyl-α-fluoroacetate, there can be obtained the following compounds of formula Ib where $R_3$, in each case, is $CH_3$:

(a) 2α - Tropanyl α-(4-chlorophenyl)-α-phenyl-α-fluoroacetate [Ib: $R_1$ is 4-$ClC_6H_4$; $R_2$ is $C_6H_5$] from 2α-tropanol and methyl α - (4-chlorophenyl)-α-phenyl-α-fluoroacetate;

(b) 2α - Tropanyl α,α-di-(4-bromophenyl)-α-fluoroacetate [Ib: $R_1$ and $R_2$ are 4-$BrC_6H_4$] from 2α-tropanol and methyl α,α-di-(4-bromophenyl)-α-fluoroacetate;

(c) 2α - Tropanyl α-(4-methylphenyl)-α-phenyl-α-fluoroacetate [IB: $R_1$ is 4-$CH_3C_6H_4$; $R_2$ is $C_6H_5$] from 2α-tropanol and methyl α-(4-methylphenyl)-α-phenyl-α-fluoroacetate;

(d) 2α-Tropanyl α-(2,3,4,5-tetramethylphenyl)-α-phenyl-α-fluoroacetate [Ib: $R_1$ is 2,3,4,5-$(CH_3)_4C_6H$; $R_2$ is $C_6H_5$] from 2α-tropanol and methyl α-(2,3,4,5-tetramethylphenyl)-α-phenyl-α-fluoroacetate;

(e) 2α-Tropanyl α-(4-cyclohexylphenyl) -α-phenyl-α-fluoroacetate [Ib: $R_1$ is 4-$C_6H_{11}C_6H_4$; $R_2$ is $C_6H_5$] from 2α-tropanol and methyl α-(4-cyclohexylphenyl)-α-phenyl-α-fluoroacetate;

(f) 2α - Tropanyl α,α - di-(3-methoxyphenyl)-α-fluoroacetate [IB: $R_1$ and $R_2$ are 3-$CH_3OC_6H_4$] from 2α-tropanol and methyl α,α-di-(3-methoxyphenyl)-α-fluoroacetate;

(g) 2α-Tropanyl α,α-di-(3,4-methylenedioxyphenyl)-α-fluoroacetate [Ib: $R_1$ and $R_2$ are

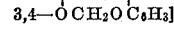

3,4—$OCH_2OC_6H_3$]

from 2α-tropanol and methyl α,α-di-(3,4-methylenedioxyphenyl)-α-fluoroacetate;

(h) 2α-tropanyl α-(4-benzyloxyphenyl) - α - phenyl-α-fluoroacetate [Ib: $R_1$ is 4-$C_6H_5CH_2OC_6H_4$; $R_2$ is $C_6H_5$] from 2α-tropanol and methyl α-(4-benzyloxyphenyl) - α-phenyl-α-fluoroacetate;

(i) 2α-αropanyl α-(4-phenoxyphenyl)-α-phenyl-α-fluoroacetate [Ib: $R_1$ is 4-$C_6H_5OC_6H_4$; $R_2$ is $C_6H_5$] from 2α-tropanol and methyl α-(4-phenoxyphenyl)-α-phenyl-α-fluoroacetate;

(j) 2α-Tropanyl α-(3-hydroxyphenyl)-α-phenyl-α-fluoroacetate [Ib: $R_1$ is 3-$HOC_6H_4$; $R_2$ is $C_6H_5$] from 2α-tropanol and methyl α-(3-hydroxyphenyl)-α-phenyl-α-fluoroacetate;

(k) 2α-Tropanyl α,α-di-(5-bromo-2-hydroxyphenyl)-α-fluoroacetate [Ib: $R_1$ and $R_2$ are 5-Br-2-$HOC_6H_3$] from 2α-tropanol and methyl α,α-di-(5-bromo-2-hydroxyphenyl)-α-fluoroacetate;

(l) 2α-Tropanyl α,α-di-(2-nitrophenyl)-α-fluoroacetate [Ib: $R_1$ and $R_2$ are 2-$NO_2C_6H_4$] from 2α-tropanol and methyl α,α-di-(2-nitrophenyl)-α-fluoroacetate;

(m) 2α-Tropanyl α-(3-methylmercaptophenyl)-α-phenyl-α-fluoroacetate [Ib: $R_1$ is 3-$CH_3SC_6H_4$; $R_2$ is $C_6H_5$] from 2α-tropanol and methyl α-(3-methylmercaptophenyl)-α-phenyl-α-fluoroacetate;

(n) 2α-Tropanyl α-(4-dimethylaminophenyl)-α-phenyl-α-fluoroacetate [Ib: $R_1$ is 4-$(CH_3)_2NC_6H_4$; $R_2$ is $C_6H_5$] from 2α-tropanol and methyl α-(4-dimethylamino phenyl)-α-phenyl-α-fluoroacetate;

(o) 2α-Tropanyl α-(4-biphenylyl)-α-phenyl-α-fluoroacetate [Ib: $R_1$ is $C_6H_5$-$C_6H_4$; $R_2$ is $C_6H_5$] from 2α-tropanol and methyl α-(4-biphenylyl)-α-phenyl-α-fluoroacetate; and (p) 2α-Tropanyl α-(4-methylsulfonylphenyl)-α-phenyl-α-fluoroacetate [Ib: $R_1$ is 4-$CH_3SO_2C_6H_4$; $R_2$ is $C_6H_5$] from 2α-tropanol and methyl α-(4 - methylsulfonylphenyl)-α-phenyl-α-phenyl-α-fluoroacetate.

Example 9

2β-Tropanyl α,α-diphenyl-α-fluoroacetate [Ib: $R_2$ and $R_3$ are $C_6H_5$; $R_3$ is $CH_3$].—Proceeding in a manner similar to that described in Example 7 above, substituting for the 2α-tropanol used therein a molar equivalent amount of 2β-tropanol, there can be obtained 2β-tropanyl α,α-diphenyl-α-fluoroacetate.

Example 10

3α-Tropanyl α,α-diphenyl-α-fluoroacetate [Ic: $R_1$ and $R_2$ are $C_6H_5$; $R_3$ is $CH_3$].—Proceeding in a manner similar to that described in Example 7 above, substituting for the 2α-tropanol used therein a molar equivalent amount of 3α-tropanol, there can be obtained 3α-tropanyl α,α-diphenyl-α-fluoroacetate.

Example 11

3β-Tropanyl α,α-diphenyl-α-fluoroacetate [Ic: $R_1$ and $R_2$ are $C_6H_5$; $R_3$ is $CH_3$].—Proceeding in a manner similar to that described in Example 7 above, substituting for the 2α-tropanol used therein a molar equivalent amount of 3β-tropanol, there can be obtained 3β-tropanyl α,α-diphenyl-α-fluoroacetate.

Example 12

6α-Tropanyl α,α-diphenyl-α-fluoroacetate [Id: $R_1$ and $R_2$ are $C_6H_5$; $R_3$ is $CH_3$].—Proceeding in a manner similar to that described in Example 7 above, substituting for the 2α-tropanol used therein a molar equivalent amount of 6α-tropanol, there can be obtained 6α-tropanyl α,α-diphenyl-α-fluoroacetate.

Example 13

6β-Tropanyl α,α-diphenyl-α-fluoroacetate [Id: $R_2$ and $R_3$ are $C_6H_5$; $R_3$ is $CH_3$].—Proceeding in a manner similar to that described in Example 7 above, substituting for the 2α-tropanol used therein a molar equivalent amount of 6β-tropanol, there can be obtained 6β-tropanyl α,α-diphenyl-α-fluoroacetate.

Example 14

2α-Nortropanyl α,α-diphenyl-α-fluoroacetate [Ib: $R_1$ and $R_2$ are $C_6H_5$; $R_3$ is H] is prepared by reacting 2α-hydroxynortropane and methyl α,α-diphenyl-α-fluoroacetate in an inert organic solvent following the manipulative procedure described above in Example 5.

Example 15

8-n-Butyl-2α-nortropanyl α,α - diphenyl-α-fluoroacetate [Ib: $R_1$ and $R_2$ are $C_6H_5$; $R_3$ is n-$C_4H_9$].—A mixture of 2α-hydroxynortropane and a molar excess of n-butyl bromide in n-butanol in the presence of sodium carbonate refluxed for about fifteen hours, and the product isolated, gives 8-n-butyl-2α-hydroxynortropane.

The latter on reaction with methyl α,α-diphenyl-α-fluoroacetate in an inert organic solvent according to the manipulative procedure described above in Example 5 gives 8-n-butyl-2α-nortropanyl α,α-diphenyl-α-fluoroacetate.

Example 16

8-Allyl-2α-nortropanyl α,α - diphenyl - α - fluoroacetate [Ib: $R_1$ and $R_2$ are $C_6H_5$; $R_3$ is $CH_2CH=CH_2$].—A mixture of 2α-hydroxynortropane and a molar excess of allyl bromide in n-butanol in the presence of sodium carbonate refluxed for about fifteen hours, and the product isolated, gives 8-allyl-2α-hydroxynortropane.

The latter on reaction with methyl α,α-diphenyl-α-fluoroacetate in an inert organic solvent according to the manipulative procedure described above in Example 5 gives 8-allyl-2α-nortropanyl α,α-diphenyl-α-fluoroacetate.

Example 17

8-(2 - Propynyl)-2α-nortropanyl α,α-diphenyl-α-fluoroacetate [Ib: $R_1$ and $R_2$ is $C_6H_5$; $R_3$ is $CH_2C\equiv CH$].—A mixture of 2α-hydroxynortropane and a molar excess of propargyl bromide in n-butanol in the presence of sodium carbonate refluxed for about fifteen hours, and the product isolated, gives 8-(2-propynyl)-2α-hydroxynortropane.

The latter on reaction with methyl α,α-diphenyl-α-fluoroacetate in an inert organic solvent according to the manipulative procedure descrbied above in Example 5 gives 8-(2-propynyl)-2α-nortropanyl α,α-diphenyl-α-fluoroacetate.

Example 18

8-Cyclopropylmethyl - 2α - nortropanyl α,α-diphenyl-α-fluoroacetate [Ib: $R_1$ and $R_2$ are $C_6H_5$; $R_3$ is $C_3H_5CH_2$].—A mixture of 2α-hydroxynortropane and a molar excess of cyclopropylmethyl bromide in n-butanol in the presence of sodium carbonate refluxed for about fifteen hours, and the product isolated gives 8-cyclopropylmethyl-2α-hydroxynortropane.

The latter on reaction with methyl α,α-diphenyl-α-fluoroacetate in an inert organic solvent according to the manipulative procedure described above in Example 5, gives 8-cyclopropylmethyl-2α-nortropanyl α,α-diphenyl-α-fluoroacetate.

Example 19

8-(2-Phenylethyl)-2α-nortropanyl α,α-diphenyl-α-fluoroacetate [Ib: $R_1$ and $R_2$ are $C_6H_5$; $R_3$ is $C_6H_5CH_2CH_2$].—A mixture of 2α-hydroxynortropane and a molar excess of phenethyl bromide in n-butanol in the presence of sodium carbonate refluxed for about fifteen hours, and the product isolated, gives 8-(2-phenylethyl) - 2α - hydroxynortropane.

The latter on reaction with methyl α,α-diphenyl-α-fluoroacetate in an inert organic solvent according to the manipulative procedure described above in Example 5 gives 8-(2-phenylethyl) - 2α - nortropanyl α,α-diphenyl-α-fluoroacetate.

We claim:

1. A compound of the formula

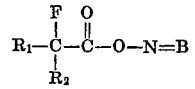

where $R_1$ and $R_2$ are phenyl, and N=B is 2-, 3-, or 6-(8-$R_3$-nortropanyl), and where $R_3$ is hydrogen, lower-alkyl, lower-alkenyl, lower-alkynyl, cycloalkyl-lower-alkyl or phenyl-lower-alkyl.

2. A compound according to Claim 1 of the formula

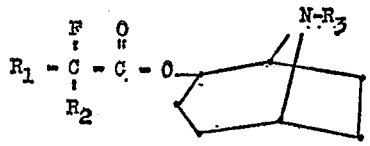

where $R_3$ is lower-alkyl.

3. A compound according to Claim 1 and having the formula

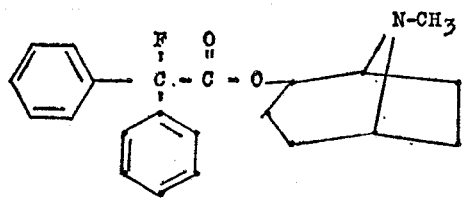

References Cited

Katritzky et al.: Advances in Heterocyclic Chemistry, vol. 7, Academic Press, New York, 1966, pp. 269–270.

Mosby: Heterocyclic Systems With Bridehead Nitrogen Atoms, part two, Interscience Publishers, Inc., New York, 1961, pp. 1336–1338 and 1347.

Wertheim: Textbook of Organic Chemistry, third ed., 1951. McGraw-Hill Book Co., New York, p. 233.

LELAND A. SEBASTIAN, Primary Examiner

U.S. Cl. X.R.

260—999, 293.53, 293.54; 424—65, 267